US011176101B2

(12) United States Patent
Kursun

(10) Patent No.: US 11,176,101 B2
(45) Date of Patent: Nov. 16, 2021

(54) SYSTEM AND METHOD FOR DECENTRALIZED REGULATION AND HIERARCHICAL CONTROL OF BLOCKCHAIN ARCHITECTURE

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 582 days.

(21) Appl. No.: 15/889,016

(22) Filed: Feb. 5, 2018

(65) Prior Publication Data

US 2019/0244306 A1 Aug. 8, 2019

(51) Int. Cl.

| G06F 16/18 | (2019.01) |
| G06F 16/182 | (2019.01) |
| G06F 16/13 | (2019.01) |
| G06F 16/176 | (2019.01) |
| G06Q 40/00 | (2012.01) |

(52) U.S. Cl.
CPC ........ *G06F 16/1865* (2019.01); *G06F 16/137* (2019.01); *G06F 16/1774* (2019.01); *G06F 16/1805* (2019.01); *G06F 16/1837* (2019.01); *G06Q 40/12* (2013.12)

(58) Field of Classification Search
CPC ............. G06F 16/1865; G06F 16/1805; G06F 16/1837; G06F 16/137; G06F 16/1774; G06Q 40/12; H04L 2209/38; H04L 9/3239
See application file for complete search history.

(56) References Cited

U.S. PATENT DOCUMENTS

| 5,224,173 A | 6/1993 | Kuhns et al. |
| 5,276,772 A | 1/1994 | Wang et al. |
| 5,325,466 A | 6/1994 | Kornacker |
| 5,359,699 A | 10/1994 | Tong et al. |
| 5,577,169 A | 11/1996 | Prezioso |
| 5,819,226 A | 10/1998 | Gopinathan et al. |
| 5,822,741 A | 10/1998 | Fischthal |
| 6,330,546 B1 | 12/2001 | Gopinathan et al. |
| 6,684,384 B1 | 1/2004 | Bickerton et al. |
| 7,815,106 B1 | 10/2010 | McConnell |
| 8,245,282 B1 | 8/2012 | Buckwalter et al. |
| 9,098,852 B1 | 8/2015 | Dangott et al. |
| 9,185,095 B1 | 11/2015 | Moritz et al. |

(Continued)

*Primary Examiner* — Neveen Abel Jalil
*Assistant Examiner* — Hubert Cheung
(74) *Attorney, Agent, or Firm* — Michael A. Springs; Moore & Van Allen PLLC; Nicholas C. Russell

(57) ABSTRACT

Embodiments of the invention are directed to a decentralized block chain regulation architecture. The invention utilizes the collective nature of block chain communication to perform key regulatory and control functions. Instead of relying on a centralized regulatory source, the present system allows the block chain structures themselves to simultaneously function as both regulated and regulatory chains for one another to form an interconnected network of decentralized, regulatory chains. Further, the system allows for control of non-compliant block chains, wherein regulatory chains may issue commands to the non-compliant chains, rewrite data, overwrite an incorrect consensus, or deactivate a chain and remove it from a block chain environment before propagation of an error.

14 Claims, 11 Drawing Sheets

(56) References Cited

U.S. PATENT DOCUMENTS

| | | |
|---|---|---|
| 9,516,053 B1 | 12/2016 | Muddu et al. |
| 9,727,723 B1 | 8/2017 | Kondaveeti et al. |
| 10,460,320 B1 | 10/2019 | Cao et al. |
| 2002/0133721 A1 | 9/2002 | Adjaoute |
| 2002/0161711 A1 | 10/2002 | Sartor et al. |
| 2007/0106582 A1 | 5/2007 | Baker et al. |
| 2007/0121596 A1 | 5/2007 | Kurapati et al. |
| 2007/0124256 A1 | 5/2007 | Crooks et al. |
| 2008/0059474 A1 | 3/2008 | Lim |
| 2010/0094767 A1 | 4/2010 | Miltonberger |
| 2010/0235908 A1 | 9/2010 | Eynon et al. |
| 2011/0055078 A1 | 3/2011 | Nandy |
| 2014/0058763 A1 | 2/2014 | Zizzamia et al. |
| 2014/0122325 A1 | 5/2014 | Zoldi et al. |
| 2014/0215612 A1 | 7/2014 | Niccolini et al. |
| 2014/0289867 A1 | 9/2014 | Bukai |
| 2015/0142595 A1 | 5/2015 | Acuna-Rohter |
| 2015/0186901 A1 | 7/2015 | Miltonberger |
| 2015/0363783 A1 | 12/2015 | Ronca et al. |
| 2016/0147583 A1 | 5/2016 | Ben Simhon et al. |
| 2017/0011460 A1* | 1/2017 | Molinari ............... G06F 21/645 |
| 2017/0134412 A1 | 5/2017 | Cheng et al. |
| 2017/0140141 A1 | 5/2017 | Yan et al. |
| 2017/0148024 A1 | 5/2017 | Yu et al. |
| 2017/0148027 A1 | 5/2017 | Yu et al. |
| 2017/0230418 A1 | 8/2017 | Amar et al. |
| 2018/0033010 A1 | 2/2018 | Ustinov et al. |
| 2018/0130034 A1* | 5/2018 | Taylor ................... G06Q 20/02 |
| 2018/0189333 A1 | 7/2018 | Childress et al. |
| 2018/0191759 A1 | 7/2018 | Baijal et al. |
| 2018/0232413 A1 | 8/2018 | Eshwar et al. |
| 2018/0248904 A1 | 8/2018 | Villella et al. |
| 2018/0268491 A1 | 9/2018 | Cuomo et al. |
| 2019/0026669 A1 | 1/2019 | Davis et al. |
| 2019/0034465 A1 | 1/2019 | Shimamura |
| 2019/0065764 A1 | 2/2019 | Wood et al. |
| 2019/0074962 A1 | 3/2019 | Ateniese et al. |
| 2019/0116185 A1* | 4/2019 | Nagai ................. G06F 16/1865 |
| 2019/0121988 A1 | 4/2019 | van de Ruit et al. |
| 2019/0155513 A1 | 5/2019 | Maeda et al. |
| 2019/0205558 A1 | 7/2019 | Gonzales, Jr. |
| 2019/0207751 A1 | 7/2019 | Harvey |
| 2019/0228468 A1* | 7/2019 | Hu ........................ H04L 9/3239 |
| 2019/0243572 A1* | 8/2019 | Kursun ................ G06F 3/0673 |
| 2019/0280855 A1 | 9/2019 | Tong |
| 2019/0370486 A1 | 12/2019 | Wang et al. |
| 2019/0384748 A1 | 12/2019 | Roennow et al. |
| 2020/0026691 A1 | 1/2020 | Qiu |
| 2020/0050595 A1 | 2/2020 | Sun et al. |
| 2020/0106621 A1 | 4/2020 | Eshwar et al. |
| 2020/0167773 A1* | 5/2020 | Cervenka ................ G06F 16/27 |
| 2020/0175001 A1* | 6/2020 | Malan ................... H04L 9/3239 |
| 2020/0286184 A1* | 9/2020 | Orsini ..................... H04L 63/12 |

* cited by examiner

SYSTEM AND METHOD FOR DECENTRALIZED REGULATION AND HIERARCHICAL CONTROL OF BLOCKCHAIN ARCHITECTURE

BACKGROUND

Block chain is a growing, highly-adaptive new technology already being implemented across multiple industries. Due to the unique characteristics inherent to the block chain structure, the regulation of block chains presents unique challenges with regards to scalability, processing speed, and data security. As a result, there exists a need for a new block chain regulatory architecture that overcomes the challenges of the conventional regulatory methods.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for implementing a decentralized block chain regulation architecture. The invention may be exampled by a system which defines a specific embodiment of the invention. The system typically comprises a plurality of nodes participating in a block chain network comprising a plurality of block chains, the plurality of block chains comprising at least one regulated chain and a plurality of regulating chains; and a controller assigned through a decentralized process for managing regulation of the block chain network, the controller comprising at least one memory device with computer-readable program code stored thereon, at least one communication device connected to a network, and at least one processing device, wherein the at least one processing device is configured to execute the computer-readable program code to: generate at least one regulatory hyperchain from the plurality of regulating chains, wherein the at least one regulatory hyperchain collectively regulates one or more of data, processes, and health of the at least one regulated chain based on regulatory requirements of the at least one regulated chain; broadcast at least a portion of regulatory data from the at least one regulated chain to the at least one regulatory hyperchain; collect and analyze the portion of regulatory data from the at least one regulated chain with the at least one regulatory hyperchain; based on analyzing the portion of regulatory data, determine a regulatory action for the at least one regulated chain; and trigger execution of the regulatory action on the at least one regulated chain.

In some embodiments, the controller is configured to assign at least one smart contract configured to dynamically control a transfer of regulatory data or actions between the at least one regulated chain and the at least one regulatory hyperchain based on the regulatory requirements associated with the at least one regulated chain.

In some embodiments, the at least one smart contract is a cross-chain smart contract that controls the transfer of data across one or more of the plurality of block chains of the block chain network.

In some embodiments, a plurality of smart contracts are assigned to a group of the at least one regulated chain and the at least one regulatory hyperchain, wherein each of the plurality of smart contracts are associated with managing a unique regulatory requirement for the group.

In some embodiments, the plurality of block chains of the block chain network form a recursive hierarchy of self-regulating interconnected hyperchains, wherein each of the plurality of block chains participate within the recursive hierarchy as both a regulated chain and a regulating chain for one another.

In some embodiments, the recursive hierarchy of self-regulating interconnected hyperchains report to a central regulatory authority.

In some embodiments, broadcasting the portion of the regulatory data from the regulated chain to the at least one regulatory hyperchain further comprises anonymizing and transforming (i.e., to another format or the like) the regulatory data prior to broadcasting the regulatory data to the at least one regulatory hyperchain.

In some embodiments, broadcasting the portion of the regulatory data from the regulated chain to the at least one regulatory hyperchain further comprises broadcasting at least one of non-critical meta-data, data hashes, data slices, markers, and identifiers associated with the regulatory data.

In some embodiments, the determined regulatory action is locally resolvable by the at least one regulatory hyperchain, wherein the at least one regulatory hyperchain triggers the execution of the regulatory action on the at least one regulated chain.

In some embodiments, the regulatory action comprises at least one of providing an operation command to the at least one regulated chain, rewriting information on the at least one regulated chain, overwriting a consensus of the at least one regulated chain, and deactivating or removing at least a portion of the at least one regulated chain from the block chain network.

In some embodiments, the controller is further configured to: assign at least one regulatory node to each of the at least one regulatory hyperchain, wherein each of the at least one regulatory node is in communication with a central regulatory authority; and transmit, via the at least one regulatory node, a report from each of the at least one regulatory hyperchain to the central regulatory authority.

In some embodiments, the at least one regulatory hyperchain is configured to receive regulation instructions from the central regulatory authority via the at least one regulatory node.

In some embodiments, the regulation comprises auditing, checking cybersecurity, or checking block chain health.

Another embodiment of the invention includes a system for regulation and hierarchical control of block chain architecture, the system comprising: a plurality of nodes participating in a block chain network comprising a plurality of block chains; and a controller for managing regulation of the plurality of block chains, the controller comprising at least one memory device with computer-readable program code stored thereon, at least one communication device connected to a network, and at least one processing device, wherein the at least one processing device is configured to execute the computer-readable program code to: assign at least one regulatory node to each of the plurality of block chains, wherein the at least one regulatory node regulates one or more of data, processes, and health of the plurality of block chains, and wherein each of the at least one regulatory node is in communication with a central regulatory authority; monitor and collect regulatory data from each of the plurality of block chains with the at least one regulatory node on each of the plurality of block chains; and transmit a report from each of the regulatory nodes to the central regulatory authority.

In some embodiments, the at least one regulatory node receives regulation instructions from the central regulatory authority.

In some embodiments, the regulation instructions comprise providing an operation command to the at least one regulated chain, rewriting information on the at least one regulated chain, overwriting a consensus of the at least one regulated chain, and deactivating or removing at least a portion of the at least one regulated chain from the block chain network.

In some embodiments, a plurality of regulatory nodes are assigned to each of the plurality of block chains, wherein the plurality of regulatory nodes are associated with a plurality of central regulatory authorities.

Another embodiment of the invention includes a computer-implemented method for decentralized regulation of a block chain network of a plurality of block chains, the plurality of block chains comprising at least one regulated chain and a plurality of regulating chains, the method comprising: dynamically generating one or more regulatory hyperchains from the plurality of regulating chains wherein the one or more regulatory hyperchains collectively regulate one or more of data, processes, and health of the at least one regulated chain based on regulatory requirements of the at least one regulated chain; broadcasting at least a portion of regulatory data from the at least one regulated chain to the one or more regulatory hyperchains; collecting and analyzing the portion of regulatory data from the at least one regulated chain with the at least one regulatory hyperchain; based on analyzing the portion of regulatory data, determining a regulatory action for the at least one regulated chain; and triggering execution of the regulatory action on the at least one regulated chain.

In some embodiments, the method further comprises generating one or more cross-chain smart contracts for analyzing and regulating the regulatory data and characteristics of the at least one regulated chain, wherein the one or more cross-chain smart contracts control a transfer of data across one or more of the plurality of block chains of the block chain network.

In some embodiments, the plurality of block chains of the block chain network form a recursive hierarchy of self-regulating interconnected hyperchains, wherein each of the plurality of block chains participate within the recursive hierarchy as both a regulated chain and a regulating chain for one another.

In some embodiments, the regulatory action comprises at least one of providing an operation command to the at least one regulated chain, rewriting information on the at least one regulated chain, overwriting a consensus of the at least one regulated chain, and deactivating or removing at least a portion of the at least one regulated chain from the block chain network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
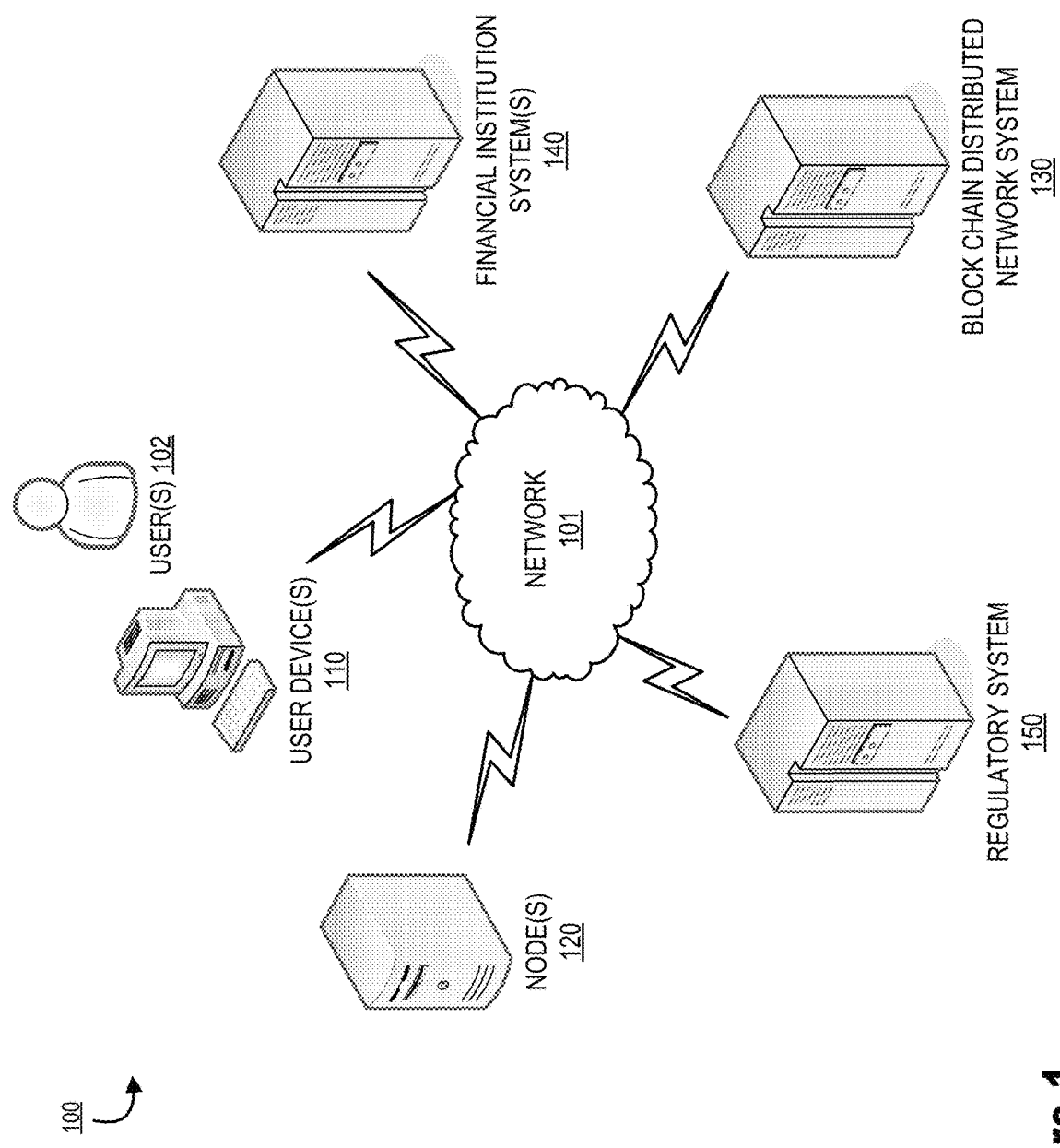
Figure 2:
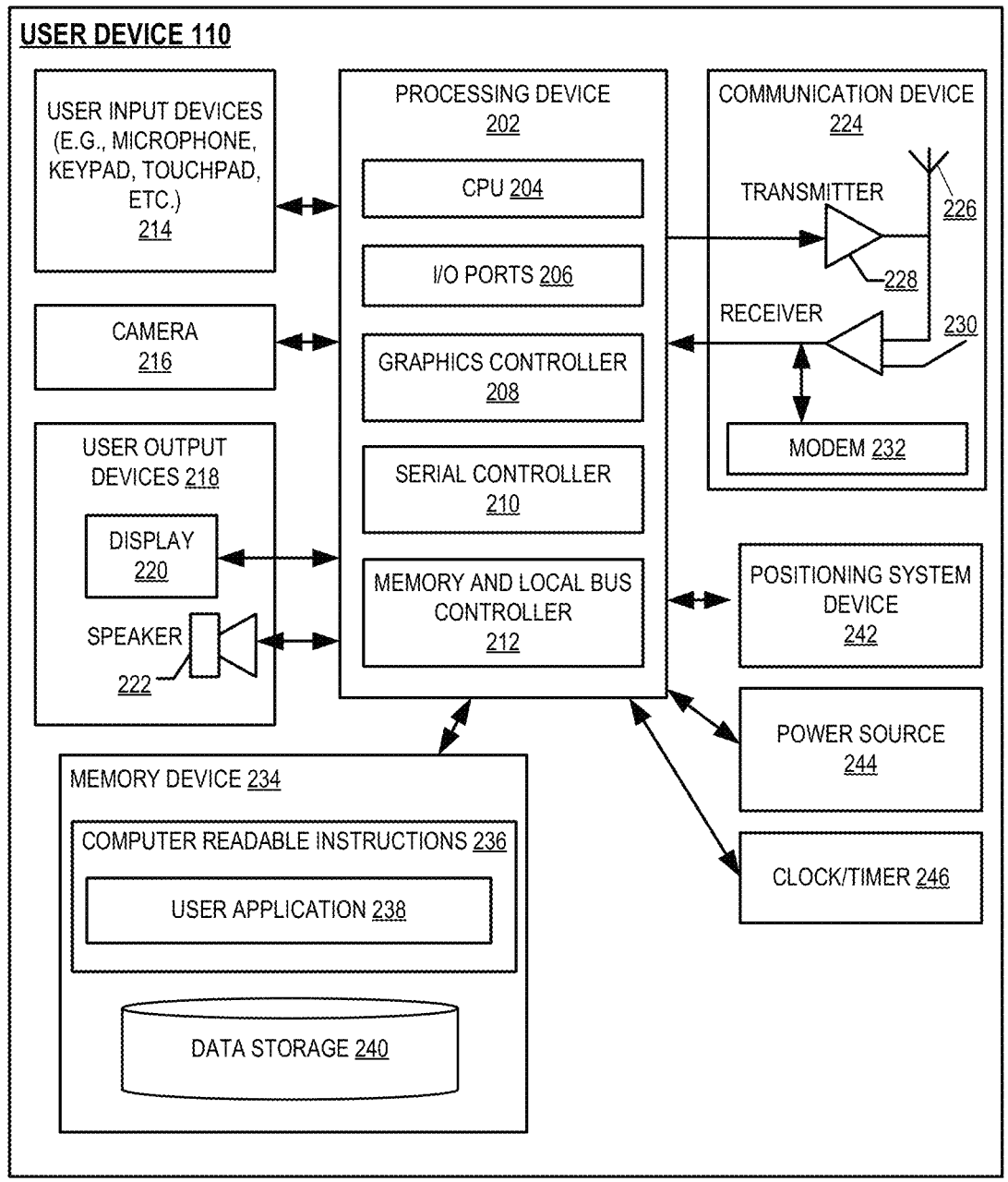
Figure 3:
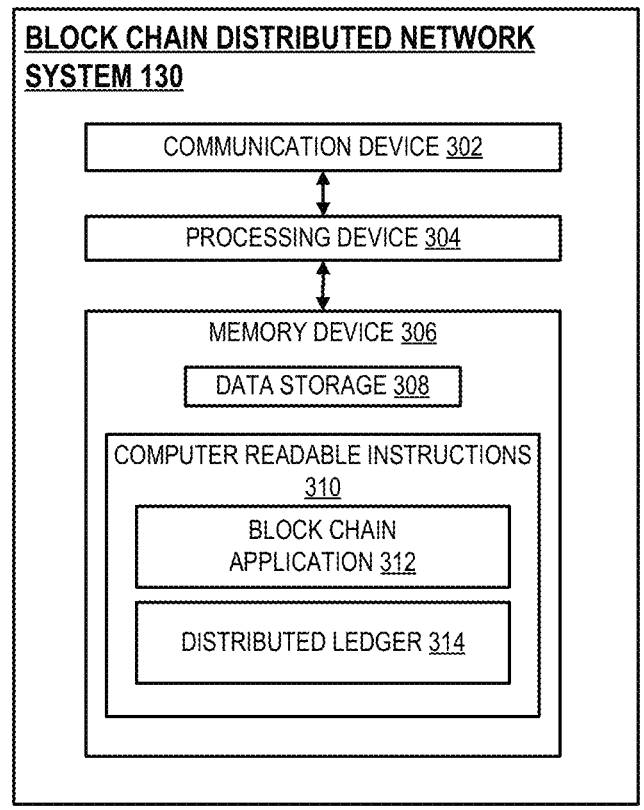
Figure 4A:
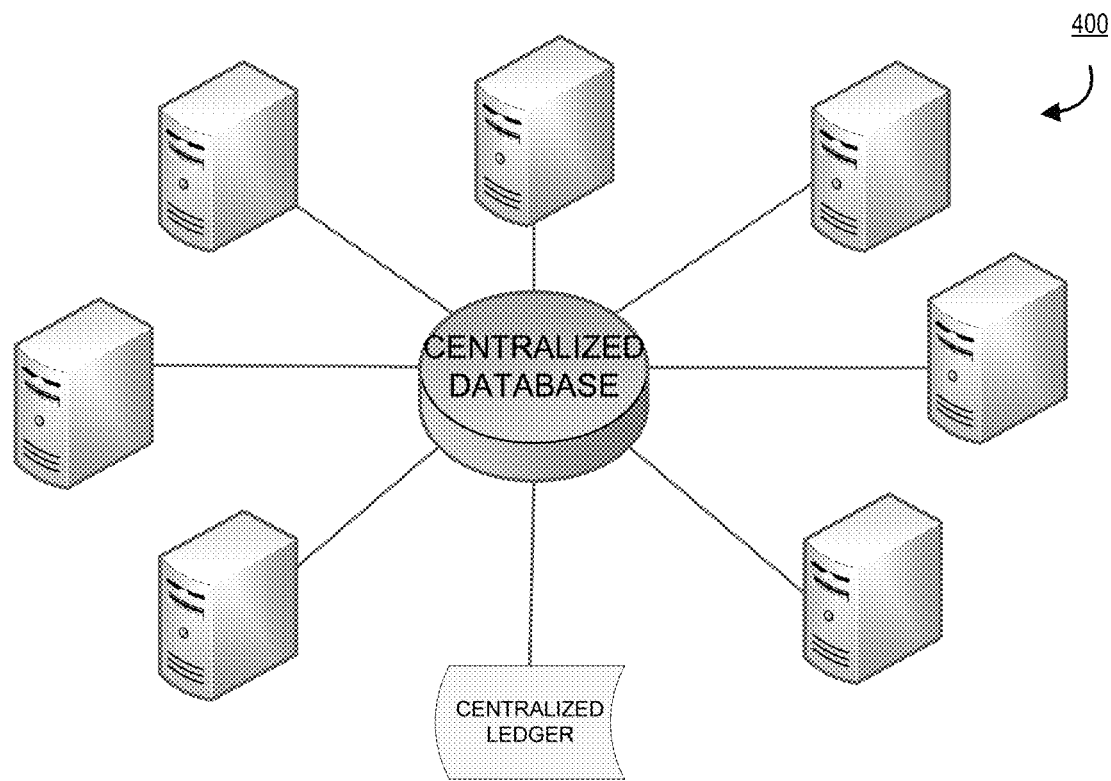
Figure 4B:
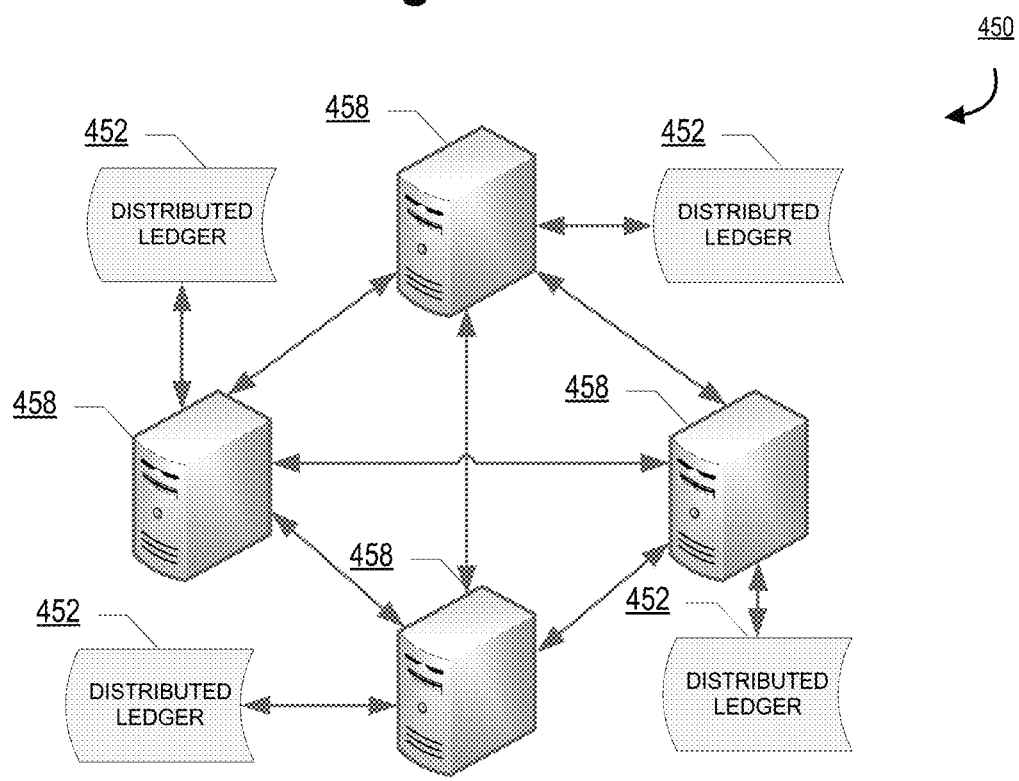
Figure 5:
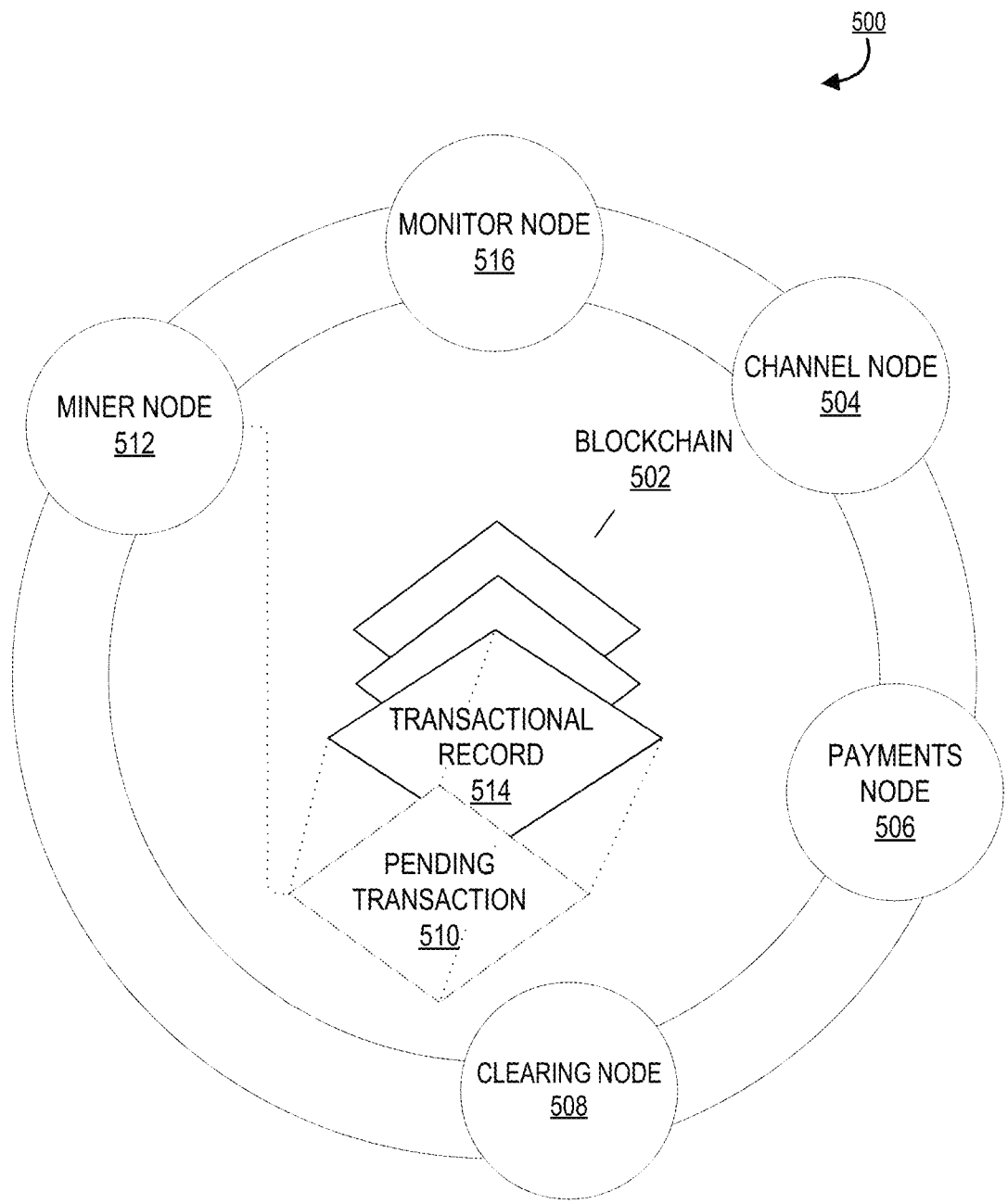
Figure 6:
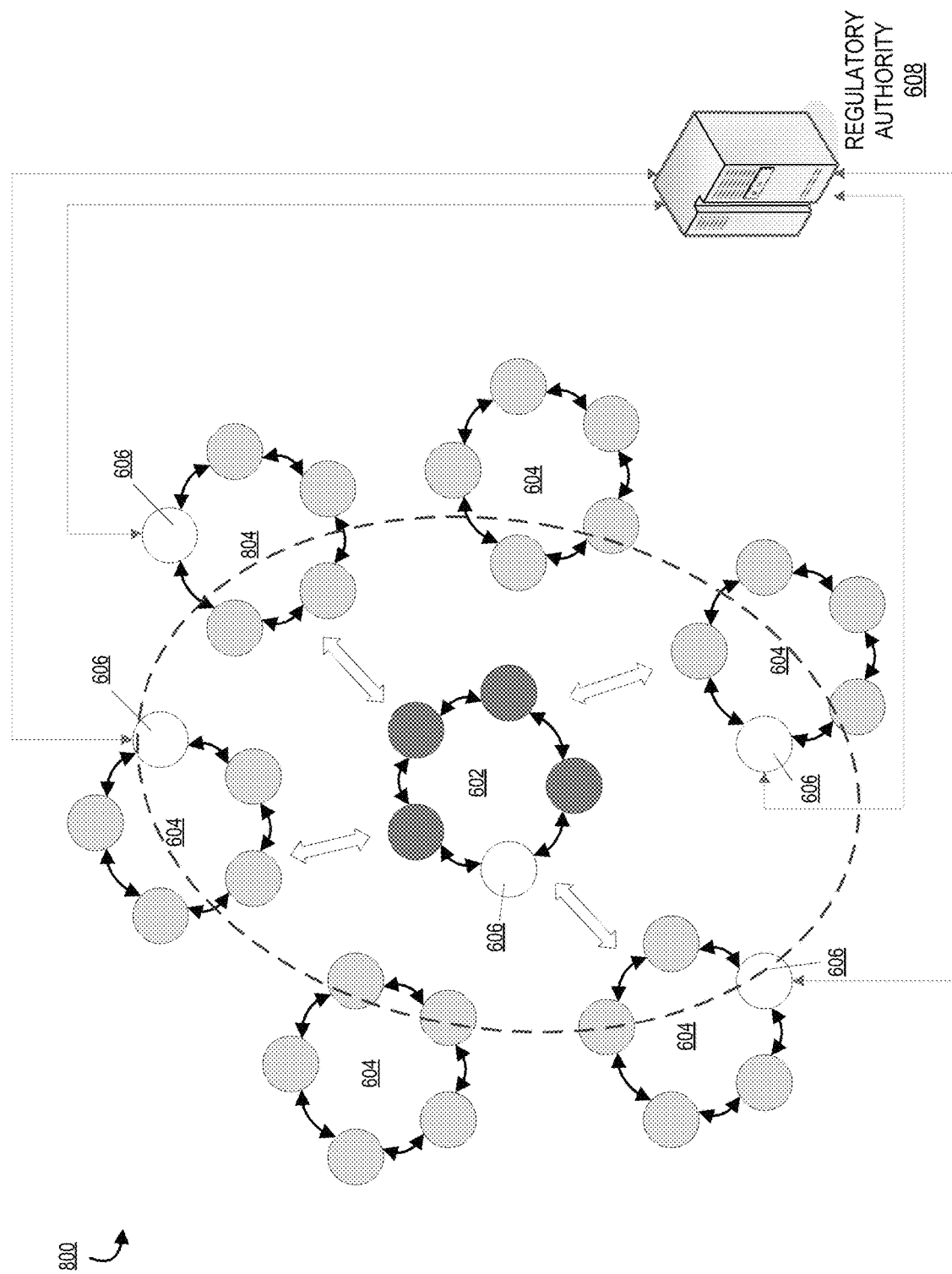
Figure 7A:
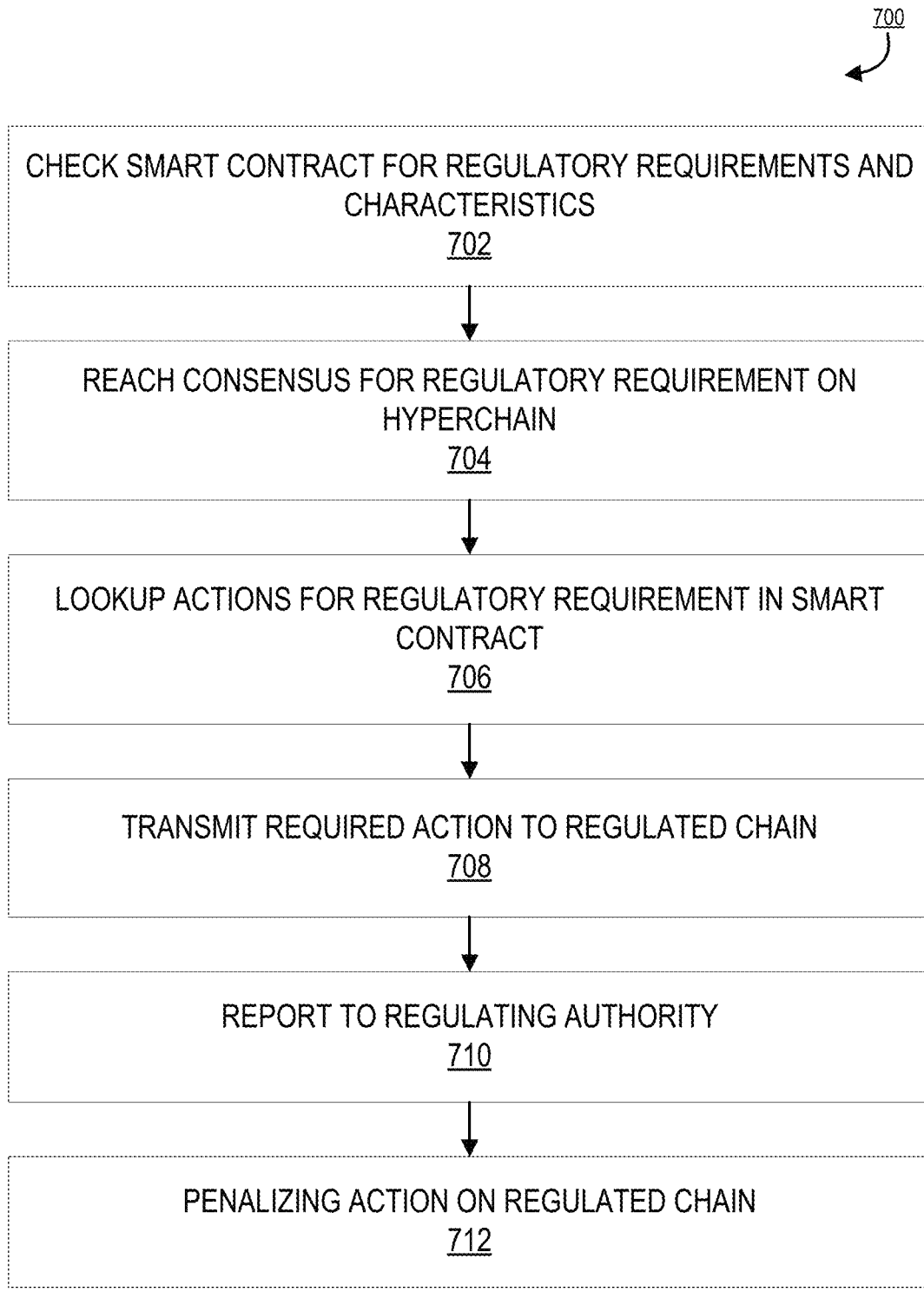
Figure 7B:
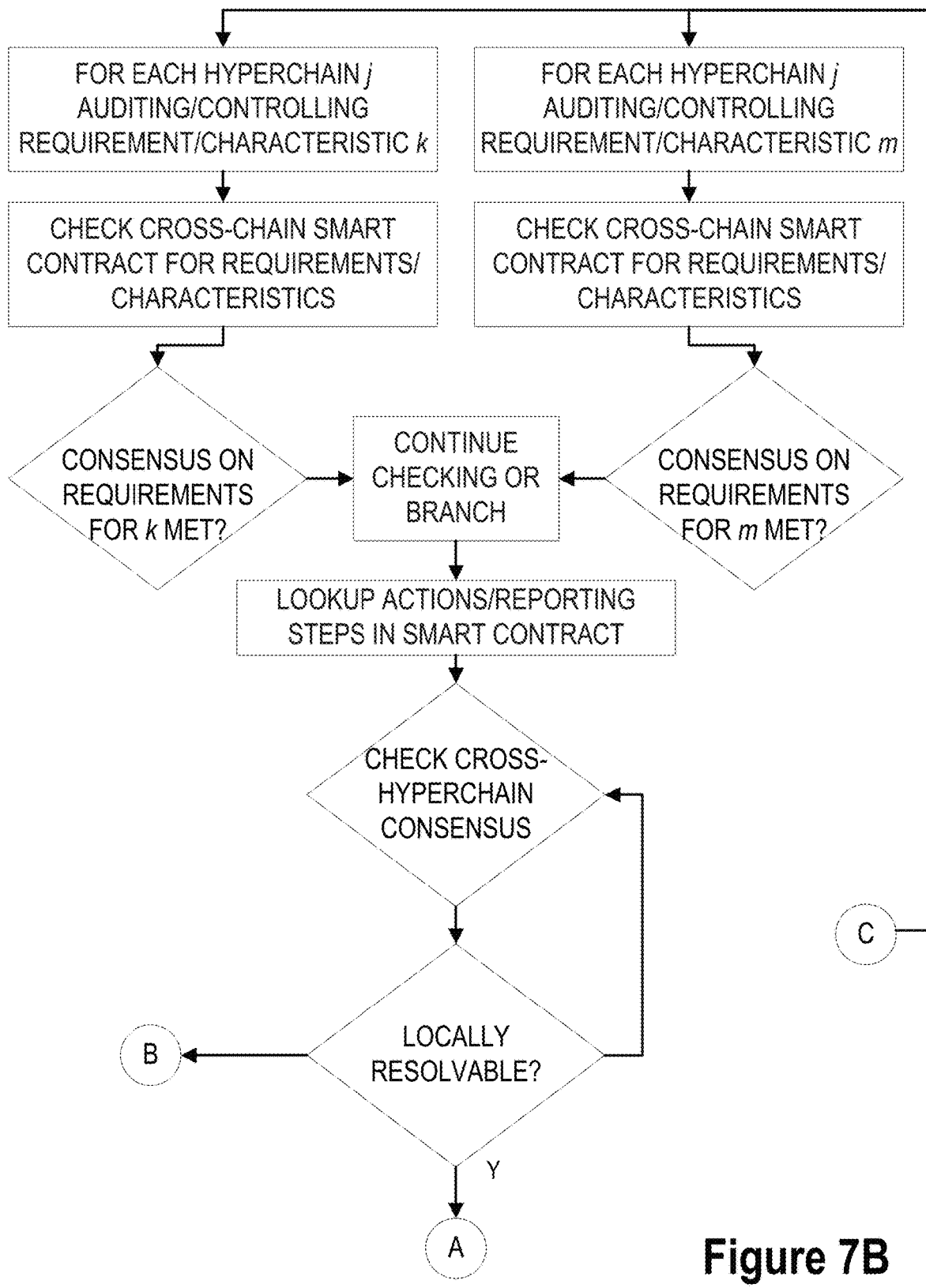
Figure 7C:
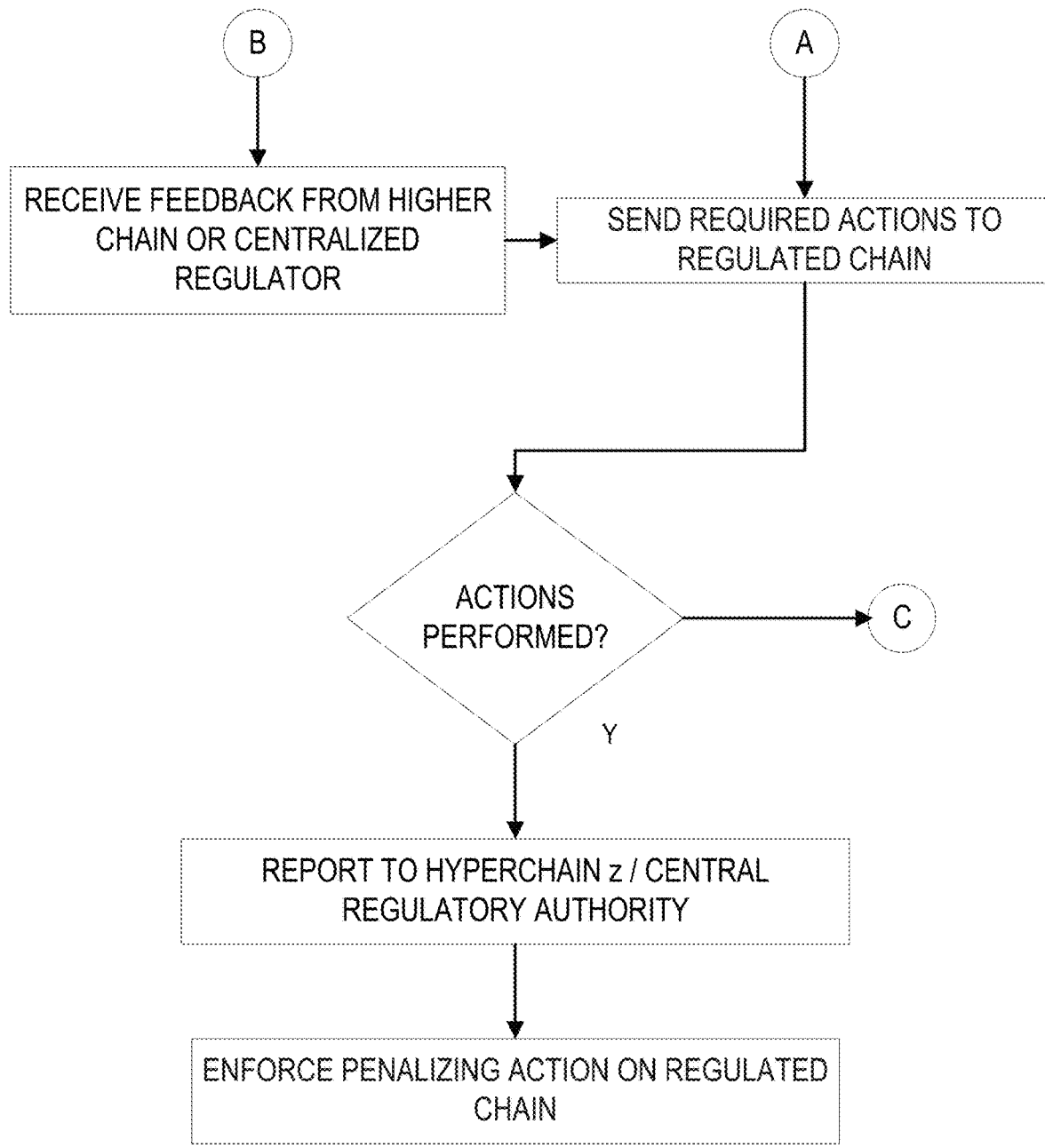
Figure 8A:
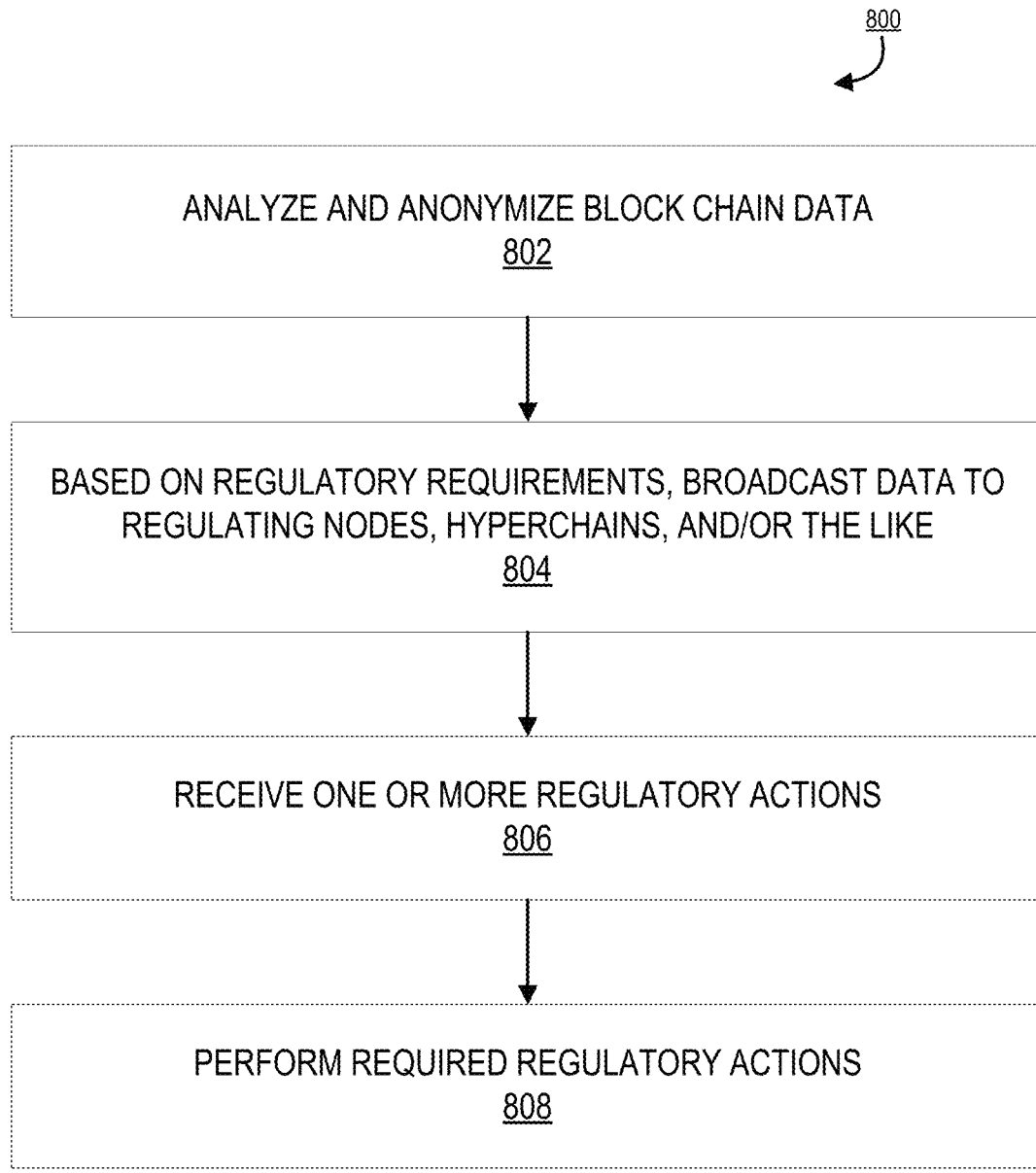
Figure 8B:
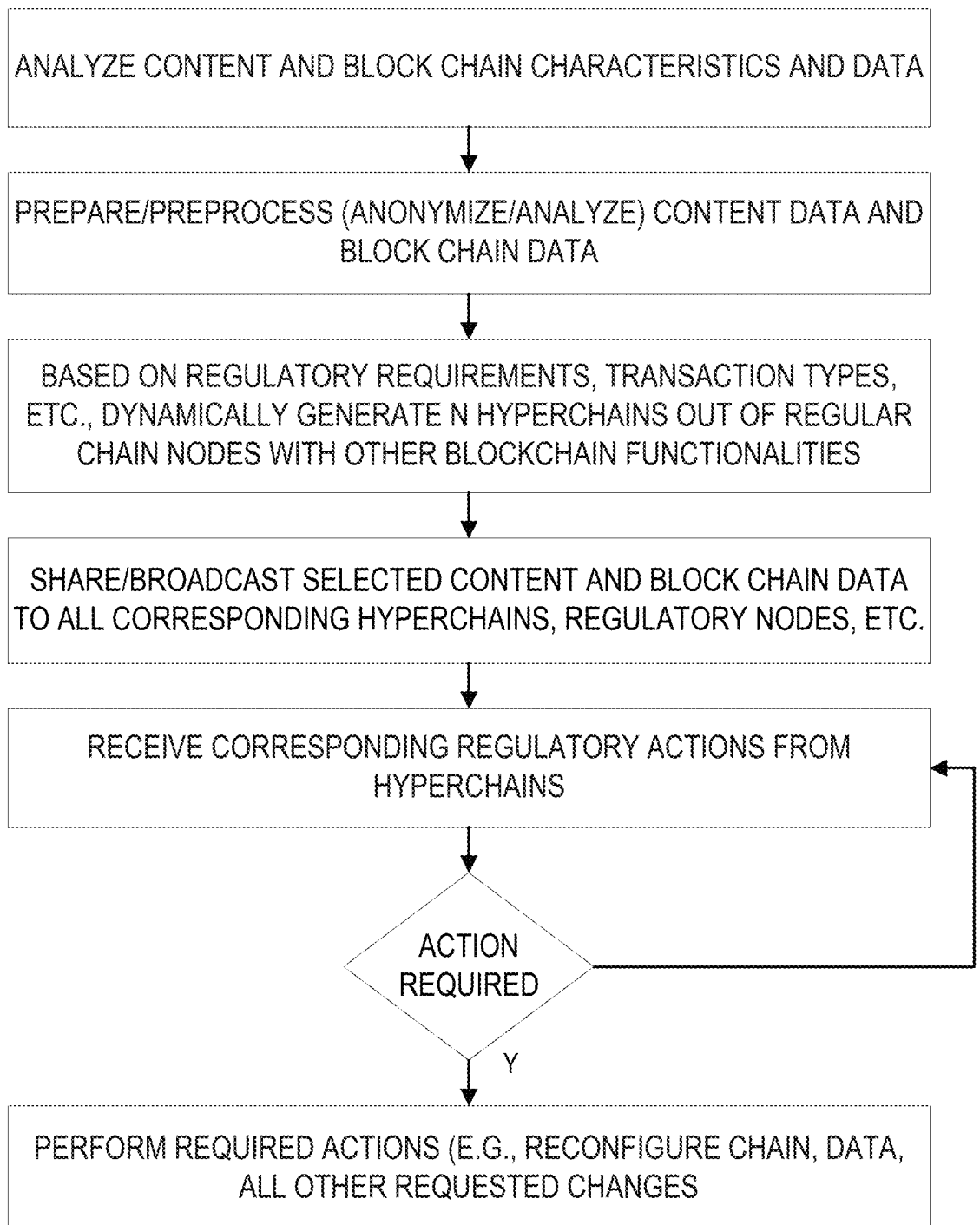

Having thus described embodiments of the invention in general terms, reference will now be made to the accompanying drawings, wherein:

FIG. 1 provides a block chain regulation system environment, in accordance with one embodiment of the invention;

FIG. 2 provides a block diagram of a user device, in accordance with one embodiment of the invention;

FIG. 3 provides a block diagram of the block chain distributed network system, in accordance with one embodiment of the invention;

FIG. 4A provides a centralized database architecture environment, in accordance with one embodiment of the invention;

FIG. 4B provides a high level block chain system environment architecture, in accordance with one embodiment of the invention;

FIG. 5 provides a high level process flow illustrating node interaction within a block chain system environment architecture, in accordance with one embodiment of the invention;

FIG. 6 provides a block diagram for illustrating a hierarchical block chain regulatory architecture, in accordance with one embodiment of the invention;

FIG. 7A provides a high level process map illustrating implementation of a decentralized block chain regulation architecture from the perspective of one or more regulating chains, in accordance with one embodiment of the invention;

FIG. 7B provides a detailed flow chart illustrating implementation of a decentralized block chain regulation architecture from the perspective of one or more regulating chains, in accordance with one embodiment of the invention;

FIG. 7C provides a detailed flow chart illustrating implementation of a decentralized block chain regulation architecture from the perspective of one or more regulating chains, in accordance with one embodiment of the invention;

FIG. 8A provides a high level process map illustrating implementation of a decentralized block chain regulation architecture from the perspective of one or more regulated chains 800, in accordance with one embodiment of the invention; and FIG. 8B provides a detailed flow chart illustrating implementation of a decentralized block chain regulation architecture from the perspective of one or more regulated chains 800, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

A "user" as used herein may refer to any entity or individual associated with the decentralized block chain regulation system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with decentralized block chain regulation system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems or devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

The terms "block chain," "blockchain," or "distributed ledger," as used herein, refer to a decentralized electronic ledger of data records which are authenticated by a federated consensus protocol. Multiple computer systems within the block chain, referred to herein as "nodes" or "compute nodes," each comprise a copy of the entire ledger of records. Nodes may write a data "block" to the block chain, the block comprising data regarding a transaction, said blocks further comprising data and/or metadata. In some embodiments, only miner nodes may write transactions to the block chain. In other embodiments, all nodes have the ability to write to the block chain. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the block chain will persist so long as the nodes on the block chain persist. A "private block chain" or "permissioned block chain" is a block chain in which only authorized nodes may access the block chain. In some embodiments, nodes must be authorized to write to the block chain. In some embodiments, nodes must also be authorized to read from the block chain. Once a transactional record is written to the block chain, it will be considered pending and awaiting authentication by the miner nodes in the block chain.

A "block" as used herein may refer to one or more records of a file with each record comprising data for transmission to a server. In some embodiments, the term record may be used interchangeably with the term block to refer to one or more transactions or data within a file being transmitted. In particular, the block chain begins with a genesis block and is subsequently lengthened by appending blocks in series to the genesis block. Generally, the data within each block within the block chain may not be modified by the nodes of the block chain; data may only be added through the addition of a block to the last block in the block chain. Each block added to the block chain may comprise a timestamp and a pointer to the previous block in the block chain. In this way, the block chain may provide an immutable record of data records over a period of time. In some embodiments, in order for a new block to be added to the block chain, a pending data record may be proposed to be added to the block chain. The nodes may then, via a "consensus algorithm" or "consensus mechanism," come to a consensus as to the contents of the data in the block chain. Once a consensus has been reached by the nodes that the pending data record is valid, the nodes append the data record to the last block in the block chain. In this way, each node maintains a validated copy of the block chain such that the block chain may remain accessible even if one or more nodes become unavailable (e.g. a node is offline due to maintenance, malfunction, etc.) and may further account for divergence from the true copy of the block chain which may occur at the node level (e.g. a copy of the block chain on a particular node becomes invalid due to data corruption, malicious editing, and the like). In other words, the consensus mechanism ensures that, over time, each node hosts a copy of the block chain that is consistent with the other nodes.

Embodiments of the invention as described herein may utilize one, several, or a combination (i.e. hybrid) of a number of different consensus algorithms to ensure the integrity of the data within the block chain. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

"Miner node" as used herein refers to a networked computer system or device that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain, thus reducing the likelihood of data record tampering and increasing the security of the transactions within the system.

Embodiments of the invention provide a technical solution to a problem by utilizing block chain systems in a nonconventional way. Unlike a more traditional centralized approach to block chain regulation, wherein one or more regulatory nodes are added to each block chain to regulate each chain with the nodes, the present invention implements a decentralized block chain regulation architecture by utilizing the collective nature of block chain communication to perform key regulatory and control functions. Instead of relying on a centralized regulatory source, the present system allows the block chain structures themselves to simultaneously function as both regulated and regulatory chains for one another to form an interconnected network of decentralized, regulatory chains.

The invention further provides a technical solution to problems inherent to the technology surrounding conventional, centralized regulation for block chains, namely: issues of scalability, speed, and security. Due to the nature of block chain growth, a centralized method of regulatory control would inevitably become overwhelmed by increasingly long chain lengths leading to decreased performance and delays in reporting, analysis, and control of the block chain. Further, conventional centralized regulation provides a single point of potential compromise for a hacking event or node failure which could seriously affect or even irreparably damage the integrity of the chain's overall health. These concerns are further enhanced when the block chains of the present invention comprise one or more permissioned block chains, wherein there are few participants and a hacking event or other data error can create a significant impact on the health of the block chain.

Further, the system allows for control of non-compliant chains, wherein regulatory chains may issue commands to the non-compliant chains, rewrite data, overwrite an incorrect consensus, or deactivate a chain and remove it from a block chain environment entirely before propagation of an error may occur.

FIG. 1 provides a system that includes specialized systems and devices communicably linked across a distributive network of nodes required to perform the functions of implementing the decentralized block chain regulation architecture as described herein. FIG. 1 provides a block chain regulation system environment 100, in accordance with one embodiment of the present invention. As illustrated in FIG. 1, the block chain distributed network system 130 is operatively coupled, via a network 101 to the user device 110, nodes 120, the financial institution system 140, and the regulatory system 150. In this way, the block chain distributed network system 130 can send information to and receive information from the user device 110, nodes 120, financial institution system 140, and the regulatory system 150. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual or system that desires to implement the decentralized block chain regulation architecture of the present invention over the network 101. In some embodiments a user 102 is a user or entity completing a transaction to be recorded on a block chain. In other embodiments, the user 102 is a user or entity managing data storage on the block chain. In yet other embodiments, the user 102 is an individual associated with a regulatory entity or agency. In some embodiments, the user 102 has a user device 110, such as a mobile phone, tablet, or the like that may interact with and control the recordation and validation of blocks on the block chain through interaction with the devices and systems of the environment 200.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for managing block chain regulatory operations either manually or using smart contracts. The user application 238 may also allow the user to view and manipulate data and perform actions on the block chain as described herein.

The processing device 202 may be configured to use the communication device 224 to communicate with one or more other devices on a network 101 such as, but not limited to the block chain distributed network system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes a financial institution system 140 (as illustrated in FIG. 1) which is connected to the user device 110, the nodes 120, the block chain distributed network system 130, and the regulatory system 150 and may be associated with one or more financial institutions or financial entities. In this way, while only one financial institution system 140 is illustrated in FIG. 1, it is understood that multiple network systems may make up the system environment 100. The financial institution system 140 generally comprises a communication device, a processing device, and a memory device. The financial institution system 140 comprises computer-readable instructions stored in the memory device, which in one embodiment includes the computer-readable instructions of a financial institution application. The financial institution system 140 may communicate with the user device 110, the nodes 120, the block chain distributed network system 130, and the regulatory system 150 to, for example, complete transactions on the block chain.

The nodes 120, and the regulatory system 150 comprise the same or similar features as the user device 110 and the financial institution system 140. In some embodiments, the nodes 120 may be user devices 110 forming a plurality of networked devices participating in a block chain environment. The regulatory system 150 is may be maintained by an entity such as a regulatory agency or financial entity for regulating data on the block chain and ensuring data health and security through the processes described herein.

FIG. 3 provides a block diagram of the block chain distributed network system 130, in accordance with one embodiment of the invention. The block chain distributed network system 130 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 306 is operatively coupled to the communication device 302 and the memory device 306. The processing device 304 uses the communication device 302 to communicate with the network 101 and other devices on the network 101, such as, but not limited to the user device 110, the nodes 120, the financial institution system 140, and the regulatory system 150. As such, the communication device 302 generally comprises a modem, server, or other device for communicating with other devices on the network 101.

As further illustrated in FIG. 3, the block chain distributed network system 130 comprises computer-readable instructions 310 stored in the memory device 306, which in one embodiment includes the computer-readable instructions 310 of a block chain application 312. In some embodiments, the memory device 306 includes data storage 308 for storing data related to the system environment, but not limited to data created and/or used by the block chain application 312.

Embodiments of the block chain distributed network system 130 may include multiple systems, servers, computers or the like maintained by one or many entities. FIG. 3 merely illustrates one of those systems that, typically, interacts with many other similar systems to form the block chain. The block chain distributed network system 130 will be outlined below in more detail with respect to FIGS. 4-6. In some embodiments, financial institution systems may be part of the block chain. Similarly, in some embodiments, the block chain distributed network system 130 is part of a financial institution system 140. In other embodiments, the financial institution system 140 is distinct from the block chain distributed network system 130. The block chain distributed network system 130 may communicate with the financial institution system 140 via a secure connection generated for secure encrypted communications between the two systems.

In one embodiment of the block chain distributed network system 130 the memory device 306 stores, but is not limited to, a block chain application 312 and a distributed ledger 314. In some embodiments, the distributed ledger 314 stores data including, but not limited to, at least portions of a transaction record. In one embodiment of the invention, both the block chain application 312 and the distributed ledger 314 may associate with applications having computer-executable program code that instructs the processing device 304 to operate the network communication device 302 to perform certain communication functions involving described herein. In one embodiment, the computer-executable program code of an application associated with the distributed ledger 314 and block chain application 312 may also instruct the processing device 304 to perform certain logic, data processing, and data storing functions of the application.

The processing device 304 is configured to use the communication device 302 to gather data, such as data corresponding to transactions, blocks or other updates to the distributed ledger 314 from various data sources such as other block chain network system. The processing device 304 stores the data that it receives in its copy of the distributed ledger 314 stored in the memory device 306.

FIG. 4A illustrates a centralized database architecture environment 400, in accordance with one embodiment of the present invention. The centralized database architecture comprises multiple nodes from one or more sources and converge into a centralized database. The system, in this embodiment, may generate a single centralized ledger for data received from the various nodes. FIG. 4B provides a general block chain system environment architecture 450, in accordance with one embodiment of the present invention. Rather than utilizing a centralized database of data for instrument conversion, as discussed above in FIG. 4A, various embodiments of the invention may use a decentralized block chain configuration or architecture as shown in FIG. 4B.

A block chain is a distributed database that maintains a list of data blocks, such as real-time resource availability associated with one or more accounts or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data blocks recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners"

who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 4B, a block chain system 450 is typically decentralized—meaning that a distributed ledger 452 (i.e., a decentralized ledger) is maintained on multiple nodes 458 of the block chain 450. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 458 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

FIG. 5 provides a high level process flow illustrating node interaction within a block chain system environment architecture 500, in accordance with one embodiment of the present invention. As illustrated and discussed above, the block chain system may comprise at least one or more nodes used to generate blocks. The nodes as discussed with respect to FIG. 5 may be the nodes 120 of the system environment 100 discussed in FIG. 1. In some embodiments, the channel node 504, payments node 506, monitor node 516 or the clearing node 508 may publish a pending transaction 510 to the block chain 502. At this stage, the transaction has not yet been validated by the miner node(s) 512, and the other nodes will delay executing their designated processes. The miner node 512 may be configured to detect a pending transaction 510. Upon verifying the integrity of the data in the pending transaction 510, the miner node 512 validates the transaction and adds the data as a transactional record 514, which is referred to as a block to the block chain 502. Once a transaction has been authenticated in this manner, the nodes will consider the transactional record 514 to be valid and thereafter execute their designated processes accordingly. The transactional record 514 will provide information about the transaction processed and transmitted through and meta-data coded therein for searchability of the transactional record 514 within a distributed ledger.

In some embodiments, the system may comprise at least one additional miner node 512. The system may require that pending transactions 510 be validated by a plurality of miner nodes 512 before becoming authenticated blocks on the block chain. In some embodiments, the systems may impose a minimum threshold number of miner nodes 512 needed. The minimum threshold may be selected to strike a balance between the need for data integrity/accuracy (i.e., security/immutability) versus expediency of processing. In this way, the efficiency of the computer system resources may be maximized.

Furthermore, in some embodiments, a plurality of computer systems are in operative networked communication with one another through a network. The network may be a system specific distributive network receiving and distributing specific network feeds and identifying specific network associated triggers.

In some embodiments, the computer systems represent the nodes of the block chain, such as the miner node or the like. In such an embodiment, each of the computer systems comprise the block chain, providing for decentralized access to the block chain as well as the ability to use a consensus mechanism to verify the integrity of the data therein. In some embodiments, an upstream system and a downstream system are further operatively connected to the computer systems and each other through the network. The upstream system further comprises a ledger and the block chain. The downstream system further comprises the block chain and an internal ledger, which in turn comprises a copy of the ledger.

In some embodiments, a copy of block chain may be stored on a durable storage medium within the computer systems or the upstream system or the downstream system. In some embodiments, the durable storage medium may be RAM. In some embodiments, the durable storage medium may be a hard drive or flash drive within the system.

FIG. 6 provides a block diagram for illustrating a hierarchical block chain regulatory architecture, in accordance with one embodiment of the present invention. The block chain structure 600 generally comprises a plurality of computing nodes participating on a plurality of block chains. In the non-limiting, illustrated embodiment of FIG. 6, a regulated chain 602 or main chain or first chain is depicted having a plurality of regulating chains 604 or periphery chains or secondary chains surrounding the regulated chain 602. In some embodiments, the periphery regulating chains 604 are external to and in communication with the regulated chain 602. It should be understood that in some embodiments, the block chain structure 600 of FIG. 6 may expand outward in a continued plurality of block chains spanning billions or trillions of chains, wherein any single block chain may be considered a regulated block chain surrounded by a plurality of regulatory or periphery chains as described herein. It should further be understood that the regulated chain 602 and plurality of regulating chains 604 shown in FIG. 6 as well as any specific positioning, numbering, or structuring of said chains are for illustrative purposes only and are used to present and explain the concepts presented herein.

Data stored on the bock chain comprises content data and block chain data. Content data is any data stored on the block chain during use of the block chain system. For example, content data may include transactional data from a transaction added to the block chain. In some embodiments, content data may further include meta-data. Generally data stored on the block chain is typically heterogeneous and may be separated into different tiers based on data criticality or privacy requirements. The lowest tier of data comprises completely non-critical or broad data that is available to the public which may include, for example, any information discoverable through a basic web search. Next, non-public information (NPI) includes any information obtained about an individual from a transaction such as account numbers, financial statements (e.g., credit cards, loan payments, settlements, and the like), insurance information, transactional data, bank data, or the like. Personal identifying information (PII) or sensitive personal information (SPI) is information that can be used on its own or with other information to identify, contact, or locate a person or to identify an individual in context. PII is of higher criticality and more closely regulated than NPI. Examples of PII include social security number, date of birth, home address, home telephone number, driver's license number, biometric data (e.g., fingerprint, retinal scan, and the like). Finally, highly critical data may refer to data that exceeds the privacy/security requirements of the previous categories. Examples of highly critical data may include trade secrets, classified information, defense strategies, and the like. While only four tiers of data criticality are described herein, in some embodiments, data may be further categorized or tiered based on one or more characteristics such as privacy level. It should be understood that data stored on the block chain and used in the systems and process described herein is not limited to transactional data, but may also include other forms of data in other fields outside of financial environments. For example, health data or records (e.g., patient records, DNA records, genomic records, and the like) may be stored on the block chain and benefit from the present invention.

Block chain data or block data may also be stored on the block chain in addition to the content data. Chain data includes data associated with characterization or identification of the block chain itself. Examples of chain data may include data or information related to length of the block chain, consensus execution, agreements/disagreements on the chain, health-check data, security-check data, performance information, encryption, regulatory compliance, undecided blocks of the chain, chain branching, and the like and/or any other statistical or descriptive information related to the block chain.

The data stored on the one or more block chains and the block chains themselves may have different permissions, requirements, qualities, characteristics, and the like associated with the data. Data may be stored on particular nodes, chains, and/or within particular regions of the block chain hierarchy, as described herein, having data characteristics that match the requirements called for by or assigned to the data. Characteristics or requirements of the data may include characteristics or requirements associated with data privacy, security, immutability, energy usage or efficiency, storage, response time, and the like. Privacy requirements may include requirements for limiting exposure of the data or information to certain entities or users, (e.g., data stored within a permissioned block chain). Privacy of particular data segments may be dependent on the criticality of the data. For example, PII may require different requirements in a block chain than NPI. However, privacy, such as the privacy required by permissioned block chains, is inherently at odds with security and immutability requirements which rely on observability of the data and consensus of multiple parties (i.e., a large number of nodes) in a chain in order to validate and store a sequence of transactions in an unchangeable fashion. Observability of the data by the members of the chain is a fundamental characteristic needed for "immutability of the record" which, in essence, is not privacy preserving if attempting to reduce data exposure to a large number of other members. Energy usage or efficiency requirements may include a required amount of computing resources (e.g., number of nodes, processing power, memory, and/or bandwidth) necessary for completing operations or actions (e.g., consensus mechanisms, recording or broadcasting from the block chain, or the like) with the data which may be balanced with the energy or power required to complete said operations in a desired timeframe (i.e., response time). It should be understood that the data requirements or characteristics as discussed herein should not be considered limiting, as the invention may extend to one or more other data requirements, functionalities, and characteristics.

In some embodiments, data from the regulated chain 602 is transferred or broadcast to one or more of the regulating chains 604 while regulatory control decisions, actions, other data, and the like may be transmitted back to the regulated block chain 602 by one or more of the regulating chains 604. Regulatory control decisions and actions may include providing commands to the regulated chain, rewriting data on the regulated chain, overwriting an incorrect consensus determined by the regulated chain, or the like. In some embodiments, the system disciplines the regulated chain by for example, deactivating it or removing it from participation within the greater block chain environment. In this way, an error may be removed before propagation of the error throughout the block chain network. In some embodiments, a deactivated or removed chain may be reactivated or reintroduced into the block chain network upon correction of the error. In some embodiments, control decisions or actions may further include reporting the regulated chain to a centralized authority for the regulated chain to be modified or disciplined.

The transfer of data between block chains and management of regulatory relationships within the system of the invention is managed by one or more smart chains. Smart contracts, as described herein, are computer processes that facilitate, verify and/or enforce negotiation and/or performance of a contract between parties. Smart contracts include logic that emulates contractual clauses that are partially or fully self-executing and/or self-enforcing. The smart contracts provide guidelines for transfer of data, regulation, and control of the chains within the system. The smart contracts may further define consensus (e.g., proof of work) and encryption mechanisms for the data stored in the regulatory chains. In some embodiments, cross-chain smart contracts may be configured to dynamically form one or more additional chains or relationships between one or more nodes or chains within the architecture (e.g., regulatory hyperchains). In some embodiments, one or more cross-chain smart contracts may control and enforce the movement and/or regulation of data between a plurality of block chains.

Referring now back to a portion of FIG. 6, in one embodiment of the invention, a centralized approach to block chain regulation is taken, wherein one or more regulatory nodes 606 are added to each block chain to regulate each chain. Each of the individual regulatory nodes 606 may report directly back to one or more central regulatory authorities 608 (e.g., Securities and Exchange Commission or the like). However, due to the natural, continuous growth of a block chain environment, a purely centralized approach may provide scalability issues for maintenance by a centralized regulating authority or entity as the number of chains and chain lengths both increase.

In another embodiment, as further illustrated in FIG. 6, orthogonal to a centralized approach relying on a centralized regulatory source, the present invention allows the block chain structures themselves to simultaneously function as both regulated and regulatory chains for one another to form an interconnected network of decentralized, regulatory oversight that recursively extends throughout the block chain structure 600. The regulated chain 602 and the plurality of regulating chains 604 work in unison and perform complimentary tasks required for regulation purposes.

As depicted in FIG. 6, one or more nodes and/or chains may form a regulatory "hyperchain" (dashed line) which acts as a decentralized regulatory system for monitoring and regulating data, compliance auditing, and health of a regulated chain. In a portion of the illustrated environment, the periphery, regulating chains 604 utilize the collective nature of block chain communication to perform key regulator and control functions for at least one regulated chain 602. In some embodiments, a hierarchy of hyperchains may be formed, wherein the hierarchy of hyperchains allows for regulation of the plurality of block chains within the block chain structure 600, wherein each chain may participate as both a regulated and regulating chain creating a decentralized, self-regulating, recursive system environment. In some embodiments, the one or more regulating chains 604 track both content data, block chain data, chain health, statistics, characteristics, and the like according to one or more regulatory smart contracts.

In some embodiments, the regulating chains 604 selected for participation in the regulatory hyperchain contain similar functionalities, data, transaction types, or other features as the regulated chain 602. For example, a collection of block chains for banking transactions may be utilized in the regulatory hyperchain for a regulatory chain used for banking transactions.

The invention provides a technical solution to problems inherent to the technology surrounding centralized regulation for block chains, namely: issues of scalability, speed, and security. While novel and useful, due to the nature of block chain growth, the centralized method of regulatory control would inevitably become overwhelmed by long chain lengths and an expanding number of chains leading to decreased performance and delays in reporting, analysis, and regulatory control of the block chain. Further, centralized regulation provides a single point of compromise for a hacking event or node failure which could seriously affect or even irreparably damage the integrity of the chain's overall health. These concerns are further enhanced when the block chains of the present invention comprise one or more permissioned block chains, wherein there are few participants and a hacking event can create a significant impact on the health of the block chain.

The system depends on the consensus reached by regulating chains participating in the regulatory hyperchain to determine a validated result and an accurate report on the health of the main chain's data and agreement on data and regulatory actions to be performed. In some embodiments, wherein data privacy is critical (e.g., a permissioned block chain), a chain may share non-privacy critical data related to critical or private data (e.g., transaction data) on the chain such as generated meta-data, consensus history, data hashes, data slices, markers, signatures, identifiers, block chain data, other public or non-privacy critical information, or the like in order to reach consensus and validate the data. In some embodiments, if blocks on the main chain have been compromised (e.g., a hacking event, data loss event, or the like), data history may be traced back using the data recorded in the regulatory hyperchain to diagnose or identify the source of the issue. In some embodiments, data may be reconstructed using the data records stored by the decentralized regulatory system.

In another embodiment of the invention as depicted by FIG. 6, the network of regulatory chains may form a regulatory hierarchy of hyperchains that may further lead back to a centralized regulatory authority (i.e., a hybrid centralized/decentralized system of regulation). A plurality of regulatory nodes 606 may be distributed in the regulating chains 604 neighboring the regulated chain 602. While the regulatory chains 604 form the decentralized hyperchain and communicate with one another to reach consensus in a decentralized manner as previously discussed, one or more regulatory nodes 606 may be placed on said regulating chains 608 to ultimately report back to a central regulatory authority 608 and regulate the plurality of chains within the block chain structure 600. In this way, the central regulatory authority 608 may receive reports on chain health and compliance and also transmit regulation instructions back to the regulatory nodes 606 for execution of one or more control decisions or actions. In some embodiments, the regulatory nodes 606 may be maintained and operated by the central regulatory authority, agency, or financial institution.

In some embodiments, the system further comprises a controller or regulator node architecture and regulatory contract process that manages not only content of the chains, but also health, privacy, security, energy efficiency, immutability and other characteristics. The controller may further decide on changes required in the overall system or individual components based on the overall characteristics and individual characteristics of block chains, spiral chains, and/or nodes. In some embodiments, the controller may perform one or more of the processes, actions, or commands described herein.

FIG. 7A provides a high level process map illustrating the implementation of a decentralized block chain regulation architecture from the perspective of one or more regulating chains 700, in accordance with one embodiment of the present invention while FIGS. 7B and 7C provide a more detailed flowchart of the same. As illustrated in block 702, the process 700 is initiated by the system first checking one or more regulatory smart contracts (e.g., cross-chain smart contracts) to acquire regulatory requirements and characteristics for one or more regulated chains or data within the chains (i.e., privacy, security, compliance, and the like requirements and characteristics for the data/regulated chains as previously discussed). Based on the receiving data requirements, the system utilizes the regulatory hyperchains to analyze the regulatory data broadcast from the regulated chain.

In some embodiments, a plurality of smart contracts may be generated and used within the system to enforce different or unique regulatory requirements of the data or chains within the same group of chains. For example, a first smart contract can execute a regulation associated with a first requirement in a chain, while a second smart contract can execute a regulation associated with a second requirement in the same chain.

As illustrated in block 704, each hyperchain reaches consensus for the regulatory requirements of the regulated chain. The one or more hyperchains may check and/or validate data, determine non-compliance of the regulated chain, determine invalid data or an invalid consensus, or the like. In some embodiments, analysis by the regulatory hyperchain comprises reaching consensus on the regulatory data of the regulated chain separately from the regulated chain and comparing the results to determine an error in the data. An error in the regulatory data may indicate poor data health of the main chain as a result of, for example, incorrect consensus reached by the nodes of the main chain, a compromised node, an incorrectly recorded block, uncompliant transactions or the like. In some embodiments, consensus may further require consensus to be reached among a plurality of hyperchains. While consensus methods such as proof-of-work may be utilized by embodiments of this invention, it should be understood that alternative consensus mechanisms may be employed by the system as well.

As illustrated in block 706, the system looks up actions or decisions to be made as required by the smart contract for the regulatory requirements of the regulated chain. In some embodiments, the action and/or decision may be locally resolvable by the hyperchain. In other embodiments, the hyperchain may require feedback, instruction, or permission from one or more additional governing hyperchains and/or a central regulatory authority in order to determine and/or execute one or more control decisions or actions as previously discussed.

As illustrated in block 708, the system transmits a required action to the regulated chain. In response to identifying an error in the regulated chain, the regulatory hyperchain may take action to mend or quarantine the error. The system controls the regulated chain using the regulatory hyperchain based on identifying the error in the regulatory data. In some embodiments, the regulatory hyperchain may provide commands to the regulated chain, rewrite data on the regulated chain, overwrite an incorrect consensus determined by the regulated chain, or the like. In some embodiments, the regulatory hyperchain disciplines the regulated chain by for example, deactivating the regulated chain or removing the regulated chain from the block chain environment. In this way, an error may be removed before propagation of the error throughout the block chain network. In some embodiments, a deactivated or removed chain may be reactivated or reintroduced into the block chain network upon correction of the error. In one particular example, the system may determine that a chain reached consensus with too few nodes in the chain. In response to detection of the error in reaching consensus, a regulatory hyperchain may overwrite or even deactivate the chain for not being in compliance with regulations.

As illustrated in block 710, the system may optionally further report to a regulatory authority (e.g., in a hybrid, centralized/decentralized architecture). In some embodiments, the system may report on one or more characteristics of the regulated chain based on analyzing the data broadcasted by the regulated chain. Characteristics of the regulated chain may comprise regulatory compliance data, data health, data security, and the like associated with the regulated chain. Reports may be provided to a maintaining entity of the system, a user, a regulatory authority, or the like. Finally, as illustrated in block 712, the system may receive instruction from the central regulatory authority to execute one or more actions (e.g., disciplining actions) on the regulated chain.

FIG. 8A provides a high level process map illustrating the implementation of a decentralized block chain regulation architecture from the perspective of one or more regulated chains 800, in accordance with one embodiment of the present invention while FIG. 8B provides a detailed flowchart of the same. As illustrated in block 802, the process 800 is initiated by the system first analyzing and anonymizing data on the regulated block chains before being broadcast to regulating chains. For example, a data set containing personal identifying information of a group of customers may have social security numbers and other NPI removed from the set before being published. In some embodiments, the system may anonymize or encrypt content data and/or chain data by generating or extracting meta-data, data hashes, data slices, markers, identifiers or the like associated with the regulated data.

As illustrated in block 804, based on the regulatory requirements of the regulated chain, the regulated chain broadcasts or shares data to the one or more regulating nodes, chains, hyperchains, and/or the like. In some embodiments, wherein data privacy is critical (e.g., a permissioned block chain), a chain may share non-privacy or non-critical data related to private or critical (e.g., transaction data) on the chain such as generated meta-data, consensus history, data hashes, data slices, markers, signatures, identifiers, block chain data, other public or non-privacy critical information, or the like in order to reach consensus and validate the data. In some embodiments, broadcasting of the data from the regulated chain may be governed or controlled by cross-chain smart contracts.

As illustrated in block 806, the regulated chain receives one or more regulatory actions from one or more regulating nodes, chains, hyperchains, central regulatory authority, and/or the like as previously discussed with respect to FIG. 7A, and finally, as illustrated in block 808, one or more required regulatory actions may be performed on or by the regulated chain. In some embodiments, the regulated chain may perform the required actions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for decentralized regulation and hierarchical control of a block chain architecture, the system comprising:

a plurality of nodes participating in a block chain network comprising a plurality of block chains, the plurality of block chains comprising at least one regulated chain and a plurality of regulating chains; and a controller assigned for managing regulation of the block chain network, the controller comprising at least one memory device with computer-readable program code stored thereon, at least one communication device connected to a network, and at least one processing device, wherein the at least one processing device is configured to execute the computer-readable program code to:

generate at least one regulatory hyperchain from the plurality of regulating chains, wherein the plurality of regulating chains of the at least one regulatory hyperchain collectively regulates one or more of data, processes, and health of the at least one regulated chain based on regulatory requirements of the at least one regulated chain, wherein each of the plurality of regulating chains of the at least one regulatory hyperchain comprises at least one of a functionality, data, and a transaction type corresponding to the at least one regulated chain, wherein the plurality of block chains of the block chain network form a recursive hierarchy of self-regulating interconnected hyperchains, wherein each of the plurality of block chains participate within the recursive hierarchy as both a regulated chain and a regulating chain for one another, and wherein the recursive hierarchy of self-regulating interconnected hyperchains report to a central regulatory authority;

assign at least one regulatory node to each of the at least one regulatory hyperchain, wherein each of the at least one regulatory node is in communication with the central regulatory authority;

transmit, via the at least one regulatory node, a report from each of the at least one regulatory hyperchain to the central regulatory authority;

receive, via the at least one regulatory node, regulation instructions from the central regulatory authority, wherein the regulation instructions comprise auditing, checking cybersecurity, and checking block chain health;

broadcast at least a portion of regulatory data from the at least one regulated chain to the plurality of regulating chains of the at least one regulatory hyperchain, wherein the portion of regulatory data from the at least one regulated chain comprises at least one of non-critical meta-data, data hashes, data slices, markers, and identifiers associated with the regulatory data;

collect and analyze the portion of regulatory data from the at least one regulated chain with the plurality of regulating chains of the at least one regulatory hyperchain;

based on analyzing the portion of regulatory data, determine a regulatory action for the at least one regulated chain; and trigger execution of the regulatory action on the at least one regulated chain.

2. The system of claim 1, wherein the controller is configured to assign at least one smart contract configured to dynamically control a transfer of regulatory data or actions between the at least one regulated chain and the at least one regulatory hyperchain based on the regulatory requirements associated with the at least one regulated chain.

3. The system of claim 2, wherein the at least one smart contract is a cross-chain smart contract that controls the transfer of data across one or more of the plurality of block chains of the block chain network.

4. The system of claim 2, wherein a plurality of smart contracts are assigned to a group of the at least one regulated chain and the at least one regulatory hyperchain, wherein each of the plurality of smart contracts are associated with managing a unique regulatory requirement for the group.

5. The system of claim 1, wherein broadcasting the portion of regulatory data from the at least one regulated chain to the at least one regulatory hyperchain further comprises anonymizing and transforming the regulatory data prior to broadcasting the regulatory data to the at least one regulatory hyperchain.

6. The system of claim 1, wherein the determined regulatory action is locally resolvable by the at least one regulatory hyperchain, wherein the at least one regulatory hyperchain triggers the execution of the regulatory action on the at least one regulated chain.

7. The system of claim 1, wherein the regulatory action comprises at least one of providing an operation command to the at least one regulated chain, rewriting information on the at least one regulated chain, overwriting a consensus of the at least one regulated chain, and deactivating or removing at least a portion of the at least one regulated chain from the block chain network.

8. A computer-implemented method for decentralized regulation of a block chain network of a plurality of block chains, the plurality of block chains comprising at least one regulated chain and a plurality of regulating chains, the computer-implemented method comprising:

dynamically generating one or more regulatory hyperchains from the plurality of regulating chains wherein the plurality of regulating chains of the one or more regulatory hyperchains collectively regulate one or more of data, processes, and health of the at least one regulated chain based on regulatory requirements of the at least one regulated chain, wherein each of the plurality of regulating chains of the one or more regulatory hyperchains comprises at least one of a functionality, data, and a transaction type corresponding to the at least one regulated chain, wherein the plurality of block chains of the block chain network form a recursive hierarchy of self-regulating interconnected hyperchains, wherein each of the plurality of block chains participate within the recursive hierarchy as both a regulated chain and a regulating chain for one another, and wherein the recursive hierarchy of self-regulating interconnected hyperchains report to a central regulatory authority;

assigning at least one regulatory node to each of the one or more regulatory hyperchains, wherein each of the at least one regulatory node is in communication with the central regulatory authority;

transmitting, via the at least one regulatory node, a report from each of the at least one regulatory hyperchain to the central regulatory authority;

receiving, via the at least one regulatory node, regulation instructions from the central regulatory authority, wherein the regulation instructions comprise auditing, checking cybersecurity, and checking block chain health;

broadcasting at least a portion of regulatory data from the at least one regulated chain to the plurality of regulating chains of the one or more regulatory hyperchains, wherein the portion of regulatory data from the at least one regulated chain comprises at least one of non-critical meta-data, data hashes, data slices, markers, and identifiers associated with the regulatory data;

collecting and analyzing the portion of regulatory data from the at least one regulated chain with the plurality of regulating chains of the one or more regulatory hyperchains;

based on analyzing the portion of regulatory data, determining a regulatory action for the at least one regulated chain; and triggering execution of the regulatory action on the at least one regulated chain.

9. The computer-implemented method of claim 8 further comprising generating one or more cross-chain smart contracts for analyzing and regulating the regulatory data and characteristics of the at least one regulated chain, wherein the one or more cross-chain smart contracts control a transfer of data across one or more of the plurality of block chains of the block chain network.

10. The computer-implemented method of claim 9, further comprising assigning the one or more cross-chain smart contracts to a group of the at least one regulated chain and the one or more regulatory hyperchains, wherein each of the one or more cross-chain smart contracts are associated with managing a unique regulatory requirement for the group.

11. The computer-implemented method of claim 8, wherein the regulatory action comprises at least one of providing an operation command to the at least one regulated chain, rewriting information on the at least one regulated chain, overwriting a consensus of the at least one regulated chain, and deactivating or removing at least a portion of the at least one regulated chain from the block chain network.

12. The computer-implemented method of claim 8, further comprising, when broadcasting at least a portion of regulatory data from the at least one regulated chain to the plurality of regulating chains of the one or more regulatory hyperchains, anonymizing and transforming the least a portion of regulatory data prior to broadcasting the least a portion of regulatory data to the plurality of regulating chains.

13. The computer-implemented method of claim 8, wherein the determined regulatory action is locally resolvable by the at least one regulatory hyperchain, wherein the one or more regulatory hyperchains triggers the execution of the regulatory action on the at least one regulated chain.

14. The computer-implemented method of claim 8, wherein the regulatory action comprises at least one of providing an operation command to the at least one regulated chain, rewriting information on the at least one regulated chain, overwriting a consensus of the at least one regulated chain, and deactivating or removing at least a portion of the at least one regulated chain from the block chain network.

* * * * *